…

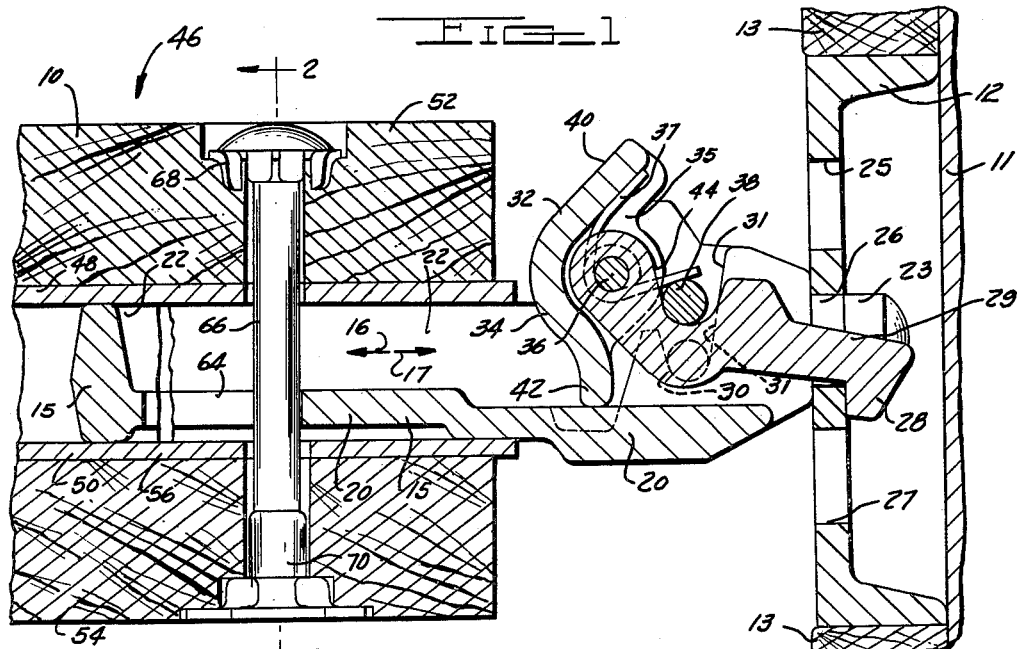

United States Patent Office 3,137,248
Patented June 16, 1964

3,137,248
CROSS MEMBER ASSEMBLY
Robert C. Schroeder and David D. Wood, Dearborn, Mich., assignors to Sparton Corporation, Jackson, Mich., a corporation of Ohio
Filed Nov. 15, 1957, Ser. No. 696,796
6 Claims. (Cl. 105—369)

This invention relates to freight bracing structure particularly useful in railroad freight cars, cargo airplanes, and freight-carrying automotive trucks.

In the bracing of freight within freight-carrying vehicles there are usually employed a number of removable, high-strength cross members which extend horizontally from one side wall of the freight storage space to the other side wall. These cross members are employed to support and buttress "bulkheads" and "deckboards" which directly engage the freight to prevent it from shifting back and forth in the storage space.

During stop and go movement of the freight-carrying vehicle the inertia forces which are set up cause the vehicle side walls to bulge outwardly in a manner tending to cause disengagement of the connection between the individual cross members and vehicle side walls. Thus, it is particularly desirable that the connection between the cross member and vehicle side wall be of such design as not to snap open during movement of the vehicle.

Objects of the present invention are to provide a cross member construction wherein:

(1) The connection between the cross member and vehicle side wall is prevented from breaking or loosening during movement of the vehicle, and (2) The cross member is of high strength construction throughout its length, while being manufacturable as a relatively low cost item.

Other objects of this invention will appear in the following description and appended claims, reference being had to the accompanying drawings forming a part of this specification wherein like reference characters desgnate corresponding parts in the several views.

In the drawings:

FIG. 1 is a sectional view through an end portion of one cross member constructed according to the present invention.

FIG. 2 is a sectional view on line 2—2 in FIG. 1.

FIG. 3 is a sectional view on the same lines as FIG. 2, but of a second embodiment of the invention.

FIG. 4 is a partial sectional view in the same direction as FIG. 3, but of a third embodiment of the invention.

FIG. 5 is a right end view of the FIG. 1 cross member with channel 12 removed for illustration purposes.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown one end portion of a cross member 10 which is adapted for horizontal positionment extending across the space between railroad freight car side wall 11 and a similar side wall, not shown.

In practice each of the freight car side walls is approximately nine and one half feet in height, and the side walls are spaced apart approximately nine feet. Each of the car side walls has secured thereon a number of horizontal channels 12 spaced from one another by wooden rub rails 13. The number of channels 12 may be varied for handling different types of freight, but in a usual installation there may be employed approximately nine channels on each side wall.

Cross member 10 must be capable of being removed from its position between channels 12 in order to permit access to the freight during unloading. Accordingly the cross member is removably connected to the channels by means of a forged metal fitting 15. The illustrated fitting 15 is slidably carried in the end portion of member 10 so as to be movable into and out of the cross member in the direction of arrows 16 and 17. In this manner the total length of the cross member assembly (including the end fittings 15) can be increased or decreased for permitting the cross member to be moved into and out of a fixed position between the channels 12.

The illustrated end fitting 15 includes a web portion 20 and two upwardly extending flange portions 21 and 22 of substantial lateral thickness. A circular pin 23 is integrally formed with each of the flange portions 21 and 22, and projects axially therefrom into a snug fit within one of a series of circular openings in channel 12. Because of the location at which sectional FIG. 1 is taken only one of the pins 23 is visible in that figure.

It will be noted from FIG. 1 that there are three circular openings 25, 26 and 27 formed in channel 12. Actually each of the channels 12 is approximately twenty feet long in a typical installation, with three vertically spaced rows of openings being formed along the entire length of the channel. In the usual installation the adjacent openings are spaced one inch apart, and the total number of openings in each channel is therefore approximately seven hundred twenty.

The spacing between the two pins 23 is twice the spacing between the channel openings. As a result when the two pins are inserted into the channel openings a central one of the openings is not occupied by a pin. This central opening cooperates with the hooked end 28 of a latch arm 29 for retaining the cross member assembly in fixed position connected to the channel. In the illustrated position of cross member 10 the "central" opening is opening 26. However the "pin 23-latch arm 29" spacing is such that the cross member can be adjusted laterally along the length of channel 12 or vertically so that its pins 23 are positioned in openings 25 or 27. Additionally the cross member can be rotated ninety degrees about its longitudinal axis to put one of the pins 23 into opening 25 and the other pin 23 into opening 27. The arrangement is similar to that shown in copending application Serial No. 564,445, filed February 9, 1956.

Latch arm 29 is provided with two integrally formed cylindrical lugs 30 which are adapted to seat in the bottom portions of slots 31 carved into the opposed surfaces of flanges 21 and 22. Lugs 30 serve to pivotally mount latch arm 29 for arcuate movement around the lug axis so as to permit the hooked end 28 to be swung upwardly to a position where it can pass to the left through opening 26 by leftward manual movement of cross member 10 or fitting 15.

However, it will be noted that latch arm 29 swingably carries a "safety" member 32, which engages web portion 20 to normally prevent any counterclockwise movement of the latch arm 29. Counterclockwise movement of latch arm 29 is possible only after "safety" member 32 has been swung away from web portion 20.

Safety member 32 includes a web section 34 and two integrally formed ears 35 (only one of which is visible in FIG. 1). A circular pin 36 is fixedly connected between the two ears 35, and rotatably extends through a cylindrical bore in latch arm 29 so as to mount member 32 for swingable movement on the latch arm around the pin 36 axis. A wire torsion spring 37 is positioned in the narrow space between one of the ears 35 and the adjacent surface of arm 29 so as to urge member 32 in a counter-clockwise direction. Spring 37 extends from the inner face of web portion 34, once completely around pin 36, and then onto an upper surface of a fixed bar 38.

Bar 38 is fixedly but removably anchored at its opposite ends in flanges 21 and 22. The bar serves three functions: namely as a support for one end of spring 37, as a stop for limiting clockwise movement of latch arm 29, and as a mechanism for holding the latch arm in a seated position while permitting easy withdrawal thereof for replacement purposes.

In operation of the latch structure, when it is desired to raise the hooked end 28 from its latched position a downward manual thumb pressure is applied on surface 40 of member 32. This thumb pressure causes member 32 to swing clockwise about pin 36. As this swinging motion continues the lower end 42 of member 32 slides along the face of web portion 20. Consequently the thumb pressure is transmitted to the left end of arm 29 so as to swing it counterclockwise about the axis of lugs 30 and thereby raise hooked end 28 from its latched position. In practice, as the lower end of member 32 slides along web portion 20 pin 36 moves downwardly; as a result the counterclockwise movement of arm 29 begins to take place almost as soon as member 32 begins its clockwise movement.

It will be noted that in the illustrated position end portion 42 is located directly below pin 36. In order for arm 29 to swing counterclockwise pin 36 must be moved in an arc around the axis of lugs 30. However the spacing between end portion 42 and lugs 30 is less than the spacing between pin 36 in lugs 30; consequently pin 36 cannot be moved counterclockwise around the axis of lugs 30 (except upon manual pressure on surface 40). Clockwise movement of pin 36 around lugs 30 is prevented by engagement of latch arm surface 44 with the left face of bar 38.

The arrangement of parts is such that any upward vertical force on the hooked end 28 is effective to move said hooked end upwardly. In practice, bulging of the freight vehicle side walls cause substantial forces to be developed on hooked end portion 28 in the arrow 17 direction. Theoretically these forces should not tend to unlatch latch arm 29. However, in practice such factors as manufacturing deviations, slight non-verticalness of the freight storage walls, non-horizontal stresses and wear of parts serve to permit the setting up of substantial vertical forces tending to unlatch hooked end 28. The presence of safety member 32 serves to effectively counteract these vertical forces so as to prevent any possibility of hooked end 28 inadvertently becoming unlatched.

The substantial forces imposed on cross member 10 (in the arrow 17 direction and in the arrow 46 direction) require that the cross member be of relatively high strength throughout its length. The FIG. 2 cross member is particularly designed for high strength.

The cross member is of uniform cross section along its entire length. It comprises two rolled steel bars 48 and 50, together with two wooden filler pieces 52 and 54. Each of the metallic bars includes a U-shaped section 56, flanges 58 and 60 projecting right angularly from opposite end portions of the U-shaped sections, and a third flange 62 projecting right angularly from flange 60. The two metallic bars have their opposed flange portions 58 and 60 spot welded at spaced points therealong to form a rigid substructure for carrying the wooden filler pieces 52 and 54. Securement of the wooden filler pieces on the bars is effected by bolts 66, torque washers 68 and nuts 70. In an actual installation the cross member is approximately eight and one half feet long, and ten evenly spaced "washer-bolt-nut" assemblies are provided along the cross member to secure the filler pieces on the metallic bars.

The cross sectional configuration of the metallic bars serves to provide a cross member in which little or no bending or other failure takes place under the influence of vertical or horizontal loads. The hollow space defined between the two U-shaped portions 56 serves to accommodate the end fittings 15. One of the end fittings is provided with an elongated slot 64 which encircles an end one of the bolts 66 to permit slidable movement of the fitting into and out of the cross member. The other end fitting 15 is provided with a circular opening in place of slot 64, whereby to fixedly position it in the other end of the cross member.

The cross member shown in FIG. 3 is similar to that shown in FIGS. 1 and 2. However metallic bars 48 and 50 have been replaced by a single aluminum bar 72, which can economically be formed by an extrusion process. Bar 72 includes two spaced parallel walls 74 and 76 interconnected by four spaced transverse walls 78, 79, 80 and 81. Walls 78 and 81 are extended at 82 and 83, and then turned inwardly at 84 and 85 to form wall portions for aiding in the retention of wooden filler pieces 86 and 88.

Securement of the filler pieces on bar 72 is economically effected by means of nails 93, which are driven through walls 74 and 76 into camming engagement with walls 79 and 80. Walls 79 and 80 diverge from one another as they leave walls 74 and 76 so as to form the desired cam surfaces 90. As the nails are driven against surfaces 90 their pointed end portions are deflected so as to hold the nails securely in their illustrated positions.

In the FIG. 3 embodiment each of the end fittings 15 are removably retained in the cross member by means of a knockout drive pin 92. The structure of the end fittings is the same as that shown in FIG. 1.

In instances where the cross member is required to handle extremely large transverse loads the ends of the cross member may be provided with metallic sleeves 94 for reinforcement purposes. The sleeves are only as long as the concealed portions of the end fittings and serve primarily as reinforcement against heavy impact loads imposed onto the end fittings.

FIG. 4 illustrates an alternate to the use of nails 93 for securing the filler pieces onto the bar 72. In the FIG. 4 embodiment hollow rivets 95 are utilized for securement purposes. The rivets are flanged at their blind ends 96 to hold the rivets in position. Initially the rivets are of uniform diameter along their lengths. Prior to installing these rivets in place a tool (not shown) is extended through the bore in the rivet. The tool is provided with an enlargement which engages end portion 96. A suitable axial force is applied to the tool to form the flange at 96, after which a portion of the tool is allowed to drop into the space between walls 78 and 79 or 80 and 81. If desired the flange 96 can be formed by placing a small explosive charge in the rivet blind end and igniting the charge by heating the rivet from its exposed end.

We claim:

1. Freight bracing structure comprising a cross member construction formed by two elongated metallic bars, two elongated non-metallic filler pieces, and two end fittings carried on opposite ends of the metallic bars; each of the bars being of uniform cross section along its length; each of the bars including a U-shaped section, first and second flanges projecting right angularly from opposite end portions of the U-shaped section, and a third flange projecting right angularly from the second flange in the direction of the U-shaped section; said bars being positioned with the U-shaped sections facing one another and with the fiirst flange of one bar engaging the second flange of the other bar; said U-shaped sections cooperating with one another to define a guide way for slidably supporting one of the end fittings; said non-metallic filler pieces being located on the outer surfaces of the bars and cooperating therewith to define a substantially rectangular sectioned cross member.

2. Freight bracing structure comprising a cross member constructioned, formed by a one-piece elongated metallic bar, two non-metallic filler pieces co-extensive in length with said bar, and two end fittings connected with end portions of the metallic bar; said bar being of uniform cross section along its length; said bar including two spaced parallel walls interconnected by four spaced transverse walls, end ones of said transverse walls being extended away from the parallel walls in opposite directions from one another and then turned inwardly parallel to the first two walls; the two inner ones of the transverse walls cooperating with central portions of the parallel walls to form a guideway for slidably supporting one of the end fittings; said non-metallic filler pieces being located on the outer surfaces of the two parallel walls and cooperating with the bar to define a substantially rectangular sectional cross member.

3. The combination of claim 3 wherein the two inner ones of the transverse walls diverge from one another as they leave the two parallel walls so as to form cam surfaces; said non-metallic filler pieces being secured on the bar by nails driven through the filler pieces and parallel walls into engagement with the cam surfaces so as to have their pointed end portions turned out of alignment with their shank portions for retaining the nails in position.

4. The combination of claim 3 wherein the filler pieces are secured on the bar by hollow stemmed rivets; each of said rivets having its head positioned on an outer face of a filler piece with its hollow stem projecting through the filler piece and adjacent parallel wall, the end of the hollow stem being flanged against the inner face of the parallel wall to retain the rivet in position.

5. The combination of claim 3 and further comprising a metallic liner sleeve fitting in each end of the cross member between the two parallel walls and inner ones of the transverse walls; said liner sleeve serving as reinforcement for heavy impact loads exerted transversely of the cross member.

6. A freight bracing cross member comprising an elongated one piece metallic bar of uniform cross section along its length; said bar including two spaced parallel walls interconnected by four spaced transverse walls, end ones of the transverse walls being extended away from the parallel walls in opposite directions from one another and then turned inwardly parallel to the first two walls; the two inner ones of the transverse walls cooperating with central portions of the parallel walls to form a guideway for slidably supporting an end fitting; and non-metallic filler pieces positioned on the outer surfaces of the two parallel walls and cooperating with the bar to define a substantially rectangular member in cross section.

References Cited in the file of this patent
UNITED STATES PATENTS

| | | |
|---|---|---|
| 2,091,869 | McCurdy | Aug. 31, 1937 |
| 2,294,795 | Moses | Sept. 1, 1942 |
| 2,497,683 | Nampa et al. | Feb. 14, 1950 |
| 2,514,229 | Fahland | July 4, 1950 |
| 2,575,550 | Fahland | Nov. 20, 1951 |
| 2,593,174 | O'Dell | Apr. 15, 1952 |
| 2,679,214 | Nampa | May 25, 1954 |
| 2,725,826 | Tobin et al. | Dec. 6, 1955 |
| 2,747,520 | Brown | May 29, 1956 |
| 2,806,436 | Johnston | Sept. 17, 1957 |
| 2,817,549 | Fahland | Dec. 24, 1957 |
| 2,821,941 | Reed | Feb. 4, 1958 |
| 2,834,304 | Chapman | May 13, 1958 |
| 2,837,039 | Schueder | June 3, 1958 |
| 2,873,695 | Tobin | Feb. 17, 1959 |
| 2,879,722 | Dunlap | Mar. 31, 1959 |
| 2,901,987 | Campbell et al. | Sept. 1, 1959 |
| 2,919,662 | Tobin | Jan. 5, 1960 |